US006609059B2

(12) United States Patent
Kawaguchi et al.

(10) Patent No.: US 6,609,059 B2
(45) Date of Patent: Aug. 19, 2003

(54) CONTROL SYSTEM FOR INTERNAL COMBUSTION ENGINE

(75) Inventors: Hiroshi Kawaguchi, Wako (JP); Hideo Moriwaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 236 days.

(21) Appl. No.: 09/880,862

(22) Filed: Jun. 15, 2001

(65) Prior Publication Data

US 2001/0053954 A1 Dec. 20, 2001

(30) Foreign Application Priority Data

Jun. 19, 2000 (JP) ...................................... 2000-182562

(51) Int. Cl.[7] .......................... G06F 19/00; F02M 25/07

(52) U.S. Cl. ....................... 701/104; 701/107; 701/108; 123/568.16

(58) Field of Search ................................ 701/104, 107, 701/108, 109, 110, 114; 73/117.3; 123/568.11, 568.16, 568.19, 568.21, 568.26

(56) References Cited

U.S. PATENT DOCUMENTS 4,004,559 A * 1/1977 Itoh ...................... 123/568.16
5,207,093 A * 5/1993 Maeda ...................... 73/118.1
5,488,938 A * 2/1996 Ohuchi .................. 123/586.16
5,653,212 A * 8/1997 Hotta et al. ............ 123/568.16

FOREIGN PATENT DOCUMENTS

DE 41 14 031 A1 11/1991
DE 42 16 044 A1 11/1993
DE 196 34 975 C1 4/1998
EP 0 778 409 A2 * 6/1997 .......... F02M/25/07
EP 0837 237 A2 * 4/1998 .......... F02M/25/07
JP 7-180615 7/1995

* cited by examiner

*Primary Examiner*—Hieu T. Vo
(74) *Attorney, Agent, or Firm*—Arent Fox Kintner Plotkin & Kahn, PLLC

(57) ABSTRACT

A control system for controlling an internal combustion engine having an exhaust gas recirculation mechanism consisting of an exhaust gas recirculation passage connected between the exhaust passage and the intake passage of the engine, and an exhaust gas recirculation valve provided in the recirculation passage for controlling an exhaust gas amount to be recirculated. Control parameter(s) of the engine are calculated according to operating conditions of the engine. An amount of change in the intake pressure between when opening the exhaust gas recirculation valve and when closing the exhaust gas recirculation valve, in the fuel-cut operation, is calculated. The abnormality of the exhaust gas recirculation mechanism is determined according to the amount of change in the intake pressure. The engine is controlled by using the control parameter suitable for a closed condition of the exhaust gas recirculation valve during a predetermined time period.

24 Claims, 10 Drawing Sheets

FIG. 9A
FIG. 9B
FIG. 9C
FIG. 9D
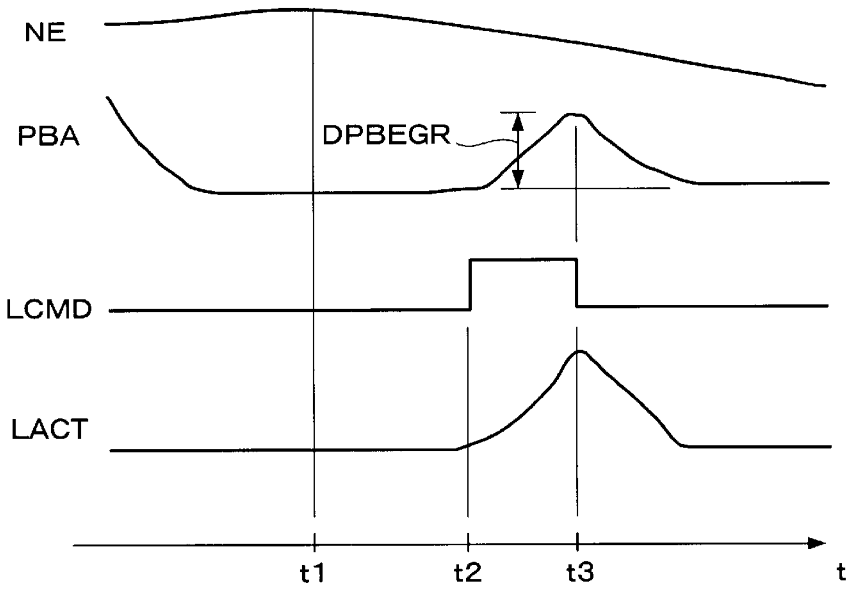
FIG. 10
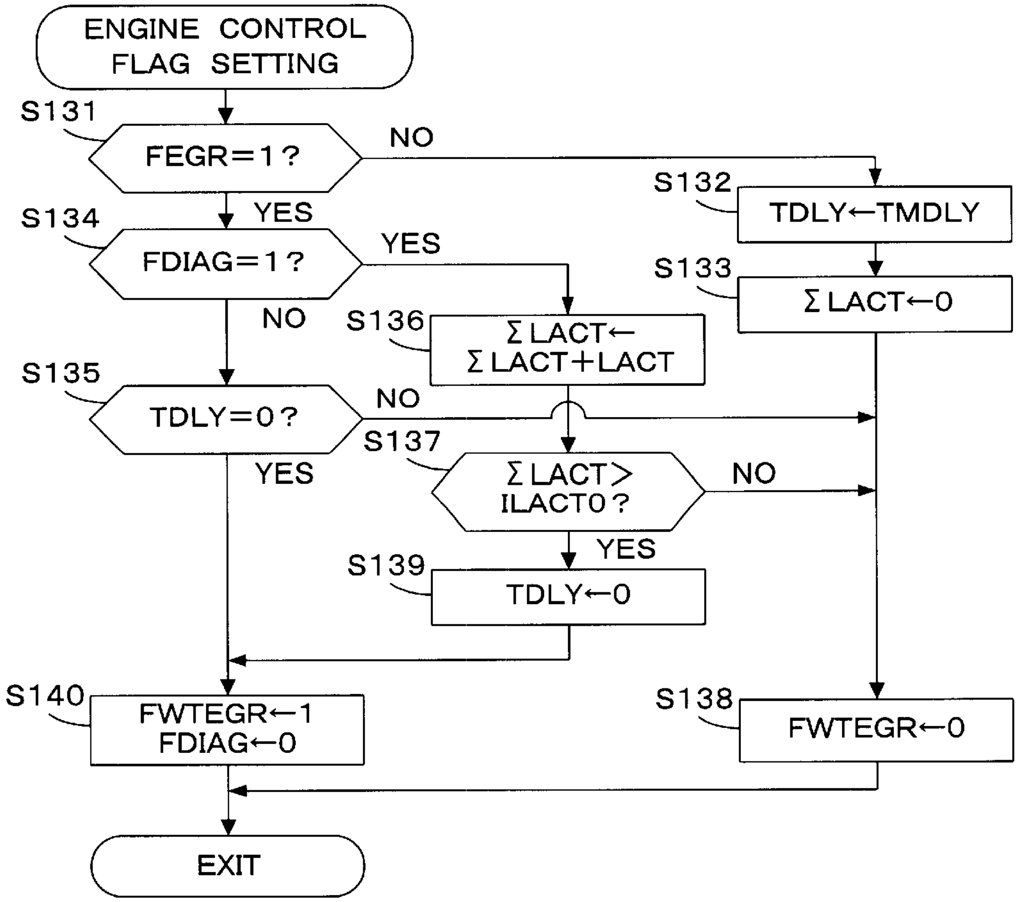

CONTROL SYSTEM FOR INTERNAL COMBUSTION ENGINE

BACKGROUND OF THE INVENTION

1. Field of the Invention

The present invention relates to a control system for an internal combustion engine, and particularly to a control system for an internal combustion engine provided with an exhaust gas recirculation mechanism for recirculating exhaust gases to an intake passage.

2. Description of Related Art

A method is conventionally known for opening and closing an exhaust gas recirculation valve in a fuel-cut operation of an internal combustion engine, where the supply of fuel to the engine is interrupted, and for determining abnormality of an exhaust gas recirculation mechanism according to a change in intake pressure, i.e., a decrease in exhaust gas recirculation amount due to clogging of an exhaust gas recirculation passage or the exhaust gas recirculation valve (Japanese Patent Laid-open No. Hei 7-180615).

In executing abnormality determination for the exhaust gas recirculation mechanism by using the above method, the exhaust gas recirculation valve is opened and closed in the fuel-cut operation of the engine, so that the exhaust gas recirculation passage is filled with air rather than exhaust gases. Accordingly, when the exhaust gas recirculation valve is then opened in the above condition, the air present in the exhaust gas recirculation passage is first supplied to the intake passage, and exhaust gases are thereafter supplied to the intake passage. As a result, if a fuel amount based on the assumption that exhaust gases are recirculated simultaneously with opening of the exhaust gas recirculation valve is supplied to the engine, there is a problem that the fuel amount becomes insufficient and the air-fuel ratio becomes leaner than a desired value. Further, an ignition timing of the engine is set to different values between when executing exhaust gas recirculation and when not executing exhaust gas recirculation, so that the ignition timing immediately after opening the exhaust gas recirculation valve deviates from an optimum ignition timing.

SUMMARY OF THE INVENTION

It is accordingly an object of the present invention to provide a control system for an internal combustion engine which can more properly set an engine control amount immediately after opening an exhaust gas recirculation valve after finishing the abnormality determination of an exhaust gas recirculation mechanism.

In accordance with the present invention, provided is a control system for controlling an internal combustion engine having an exhaust passage and an intake passage. The control system comprises an exhaust gas recirculation mechanism, a control means, a fuel supply interrupting means, a pressure detecting means, a pressure change calculating means, and abnormality determining means. The exhaust gas recirculation mechanism includes an exhaust gas recirculation passage connected between the exhaust passage and the intake passage, and an exhaust gas recirculation valve provided in the exhaust gas recirculation passage for controlling an exhaust gas amount to be recirculated from the exhaust passage through the exhaust gas recirculation passage to the intake passage. The control means is for calculating at least one control parameter of the engine according to operating conditions of the engine including an open/closed condition of the exhaust gas recirculation valve and controlling the engine by using the calculated at least one control parameter. The fuel supply interrupting means is for interrupting the supply of fuel to the engine in a decelerating operation of the engine. The pressure detecting means is for detecting an intake pressure in the intake passage. The pressure change calculating means is for calculating an amount of change in the intake pressure between when opening the exhaust gas recirculation valve and when closing the exhaust gas recirculation valve, in a fuel-cut operation where the fuel supply to the engine is interrupted by the fuel supply interrupting means. The abnormality determining means is for determining the abnormality of the exhaust gas recirculation mechanism according to the amount of change in the intake pressure. The control means controls the engine by using the at least one control parameter suitable for a closed condition of the exhaust gas recirculation valve during a predetermined time period from the time of first opening of the exhaust gas recirculation valve after finishing the abnormality determination by the abnormality determining means.

With this configuration, when first opening the exhaust gas recirculation valve after finishing the abnormality determination by the abnormality determining means, one or more control parameters suitable for the closed condition of the exhaust gas recirculation valve is/are used during the predetermined time period from the time of opening the exhaust gas recirculation valve. Accordingly, the control parameter(s) of the engine can be set to a more proper value corresponding to the supply of the air in the exhaust gas recirculation passage to the intake passage immediately after opening the exhaust gas recirculation valve after finishing the abnormality determination for the exhaust gas recirculation mechanism. As a result, a deterioration in exhaust emission characteristics and output characteristics of the engine can be prevented, and good operating characteristics of the engine can be maintained.

Preferably, the predetermined time period is a time period required for almost all quantity of air filling the exhaust gas recirculation passage to flow into the intake passage.

Preferably, the control system further comprises a lift sensor for detecting an actual valve lift amount of the exhaust gas recirculation valve. The control means accumulates the actual valve lift amount detected by the lift sensor from the time of first opening of the exhaust gas recirculation valve after finishing the abnormality determination by the abnormality determining means to thereby calculate the accumulated value of actual valve lift amounts, and the predetermined time period is set to a time period until the accumulated value of actual valve lift amounts reaches a predetermined value.

Alternatively, the predetermined time period may be a fixed time period.

Preferably, the pressure change calculating means includes reliability determining means for determining reliability of the calculated amount change in the intake pressure; and the pressure change calculating means calculates a change in the intake pressure again, when the reliability determining means determines that the reliability of the calculated amount of change in the intake pressure is low.

Preferably, the control parameter(s) include at least one of a fuel amount to be supplied to the engine and an ignition timing of the engine.

Preferably, the pressure change calculating means corrects the amount of change in the intake pressure detected by the pressure detecting means according to a rotational speed of the engine to thereby calculate the amount of change in the intake pressure.

Preferably, the control system further comprises deterioration parameter calculating means for calculating a deterioration parameter indicative of a degree of deterioration of the exhaust gas recirculation mechanism, according to the amount of change in the intake pressure between when opening the exhaust gas recirculation valve and when closing the exhaust gas recirculation valve in the fuel-cut operation. The control means corrects the at least one control parameter according to the deterioration parameter when the exhaust gas recirculation valve is open.

Other objects and features of the invention will be more fully understood from the following detailed description and appended claims when taken with the accompanying drawings.

BRIEF DESCRIPTION OF THE DRAWINGS

FIGS. 9A to 9D are time graphs for illustrating the detection of an intake pressure change in the processing of FIG. 5;

FIG. 10 is a flowchart showing a program for setting an engine control flag (FWTEGR);

DETAILED DESCRIPTION OF THE PREFERRED EMBODIMENTS

Hereinafter, preferred embodiments of the present invention will be described with reference to the drawings.

Figure 1:
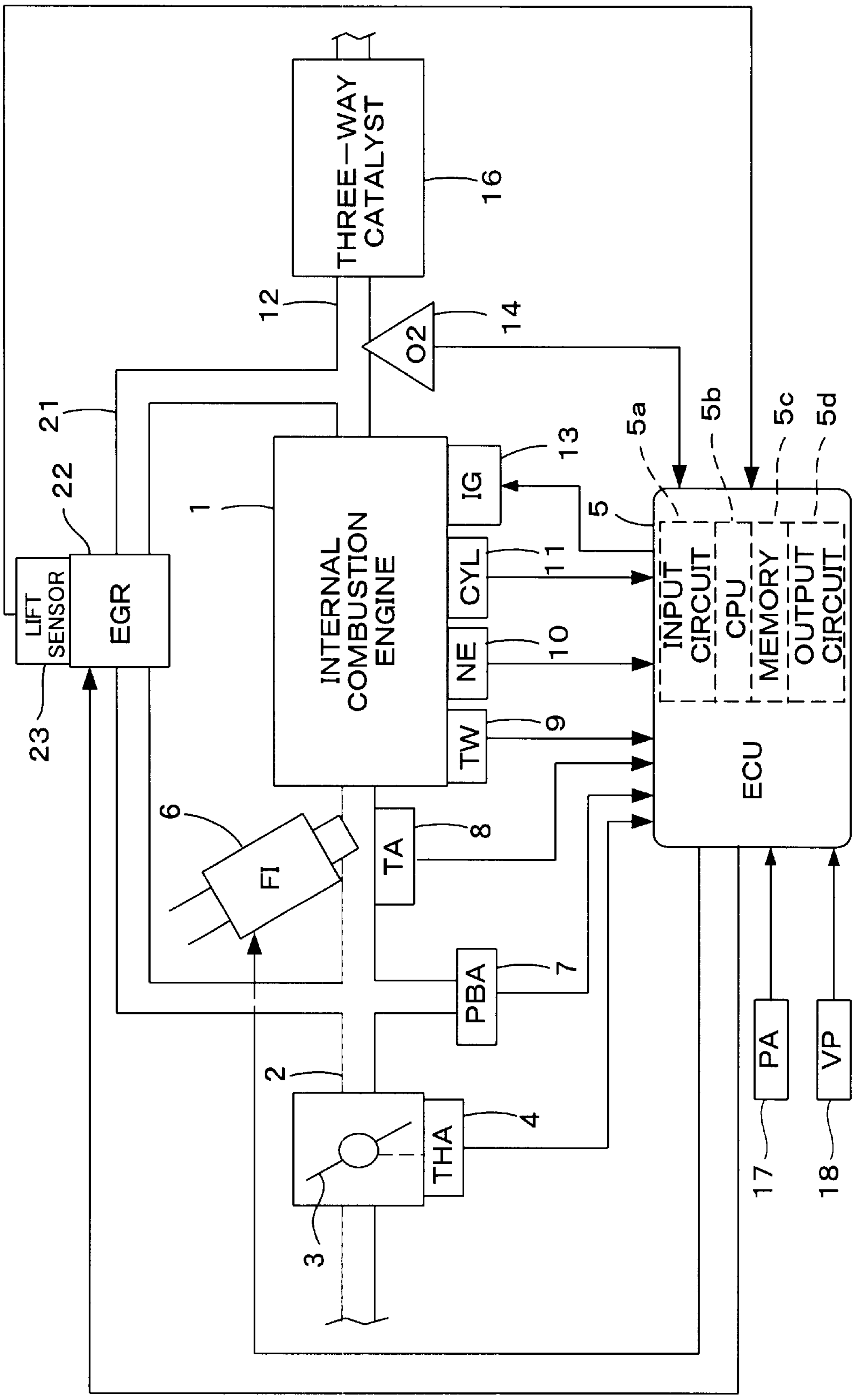
FIG. 1 is a schematic diagram showing the configuration of an internal combustion engine and a control system therefore according to a preferred embodiment of the present invention.

Referring to FIG. 1, schematically shown are a general configuration of an internal combustion engine and a control system therefore according to a preferred embodiment of the present invention. Engine 1 is a four-cylinder engine, for example, and has an intake pipe 2 provided with a throttle valve 3. A throttle valve opening (THA) sensor 4 is connected to the throttle valve 3, so as to output an electrical signal corresponding to a valve opening of the throttle valve 3 and supply the electrical signal to an electronic control unit (which will be hereinafter referred to as "ECU") 5 for controlling the engine 1.

Fuel injection valves 6, for respective cylinders, are inserted into the intake pipe 2 at locations intermediate between the engine 1 and the throttle valve 3, slightly upstream of respective intake valves (not shown). All the fuel injection valves (FI) 6 are connected to a fuel pump (not shown) and electrically connected to the ECU 5. A valve opening period of each fuel injection valve 6 is controlled by a signal from the ECU 5. Further, each cylinder of the engine 1 is provided with a spark plug 13 connected to the ECU 5. The ignition timing of each spark plug 13 is controlled by an ignition signal from the ECU 5.

An absolute intake pressure (PBA) sensor 7 is provided immediately downstream of the throttle valve 3 as pressure detecting means for detecting a pressure in the intake pipe 2. The absolute intake pressure sensor 7 converts an absolute pressure signal to an electrical signal and supplies it to the ECU 5. An intake air temperature (TA) sensor 8 is provided downstream of the absolute intake pressure sensor 7 to detect intake air temperature TA. An electrical signal corresponding to the detected intake air temperature TA is output from the intake air temperature sensor 8 and supplied to the ECU 5.

An engine coolant temperature (TW) sensor 9, such as a thermistor or thermal couple, is mounted on the body of the engine 1 to detect engine coolant temperature (cooling water temperature) TW. A temperature signal corresponding to the detected engine coolant temperature TW is output from the sensor 9 and supplied to the ECU 5.

An engine rotational speed (NE) sensor 10 and a cylinder discrimination (CYL) sensor 11 are mounted near the outer periphery of a camshaft or crankshaft (both not shown) of the engine 1. The engine rotational speed sensor 10 outputs a TDC signal pulse at a crank angle position before a top dead center (TDC) by a predetermined crank angle (at every 180 deg crank angle in the case of a four-cylinder engine). The top dead center (TDC) corresponds to the beginning of an intake stroke of each cylinder of the engine 1. The cylinder discrimination sensor 11 outputs a cylinder discrimination signal pulse at a predetermined crank angle position of a specific cylinder. These signal pulses output from the sensors 10 and 11 are supplied to the ECU 5.

An exhaust pipe 12 of the engine 1 is provided with a three-way catalyst 16 for reducing NOx, HC, and CO contained in exhaust gases. An oxygen concentration sensor (which will be hereinafter referred to as "O2 sensor") 14, as an air-fuel ratio sensor, is mounted on the exhaust pipe 12 at a position upstream of the three-way catalyst 16. The O2 sensor 14 outputs an electrical signal corresponding to the oxygen concentration (air-fuel ratio) in the exhaust gases, and supplies the electrical signal to the ECU 5.

An exhaust gas recirculation passage 21 is connected between a portion of the intake pipe 2 downstream of the throttle valve 3 and a portion of the exhaust pipe 12 upstream of the three-way catalyst 16. The exhaust gas recirculation passage 21 is provided with an exhaust gas recirculation valve (which will be hereinafter referred to as "EGR valve") 22 for controlling an exhaust gas recirculation amount. The EGR valve 22 is an electromagnetic valve having a solenoid, and its valve opening degree is controlled by the ECU 5. The EGR valve 22 may be provided with a lift sensor 23 for detecting the valve opening degree (valve lift amount) LACT of the EGR valve 22 and for supplying a detection signal to the ECU 5. The exhaust gas recirculation passage 21 and the EGR valve 22 constitute an exhaust gas recirculation mechanism.

An atmospheric pressure sensor 17 for detecting atmospheric pressure PA is connected to the ECU 5. A vehicle speed sensor 18 for detecting a vehicle speed VP of a vehicle driven by the engine 1 is also connected to the ECU 5. Detection signals from these sensors 17 and 18 are supplied to the ECU 5.

The ECU 5 includes an input circuit 5*a* having various functions including a function of shaping the waveforms of input signals from the various sensors, a function of correcting the voltage levels of the input signals to a predetermined level, and a function of converting analog signal values into digital signal values. The ECU 5 also includes a central processing unit (which will be hereinafter referred to as "CPU") 5*b*, a memory 5*c* for preliminarily storing various operational programs to be executed by the CPU 5*b* and for storing the results of computation or the like by the CPU 5*b*, and an output circuit 5*d* for supplying drive signals to the fuel injection valves 6, to the spark plugs 13, and to the EGR valve 22.

The ECU 5 determines engine operating conditions according to various engine parameter signals and sets a valve lift command value LCMD for the EGR valve 22 according to the engine rotational speed NE and the absolute intake pressure PBA. The ECU 5 supplies a control signal to the solenoid of the EGR valve 22 so that a deviation between the valve lift command value LCMD and an actual valve lift amount LACT detected by the lift sensor 23 becomes zero.

The CPU 5*b* determines various engine operating conditions, such as a feedback control operating condition where an air-fuel ratio is feedback-controlled according to a detected value from the O2 sensor 14 and an open-loop control operating condition, according to various engine parameter signals as mentioned above. The CPU 5*b* computes a fuel injection period TOUT of each fuel injection valve 6 to be opened in synchronism with the TDC signal pulse in accordance with Eq. (1) according to the above determined engine operating conditions. The fuel injection period TOUT is proportional to a fuel injection amount by each fuel injection valve 6, so that it is referred to also as a fuel injection amount in this specification.

$$TOUT=TIM\times KO2\times KEGR\times KTOTAL \qquad \text{Eq.(1)}$$

TIM is a basic fuel injection period of each fuel injection valve 6 and is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA. That is, the basic fuel amount TIM has a value substantially proportional to an intake air amount (mass flow) during every one TDC period (time period of generation of the TDC signal pulse).

KO2 is an air-fuel ratio correction coefficient set according to an output from the O2 sensor 14 in the air-fuel ratio feedback control operating condition. In the open-loop control operating condition, the air-fuel ratio correction coefficient KO2 is set to a predetermined value or to a learning value according to engine operating conditions.

KEGR is an EGR correction coefficient set to 1.0 (noncorrection value) when exhaust gas recirculation is not carried out (when the EGR valve 22 is closed) or set to a value smaller than 1.0 when exhaust gas recirculation is carried out (when the EGR valve 22 is opened) to decrease a fuel injection amount with a decrease in the intake air amount.

KTOTAL is a coefficient obtained by multiplying all the other correction coefficients, such as a water temperature correction coefficient KTW set according to the engine coolant temperature TW and a high-load incremental correction coefficient KWOT set to a value larger than 1 in a high-load operating condition of the engine.

In a predetermined decelerating operating condition of the engine 1, the fuel injection period TOUT is set to "0" to perform a fuel-cut operation.

The CPU 5*b* calculates an ignition timing IGLOG (advance angle with respect to a top dead center) from Eq. (2) shown below.

$$IGLOG=IGMAP+IGCR \qquad \text{Eq.(2)}$$

IGMAP is a basic ignition timing calculated by retrieving IG maps set according to the engine rotational speed NE and the absolute intake pressure PBA. IGCR is a correction term set according to an engine operating condition. The IG maps consists of an EGR map to be used when executing the EGR (Exhaust Gas Recirculation) and a non-EGR map to be used when not executing the EGR. In this preferred embodiment, the ignition timing is controlled according to the degree of deterioration of the exhaust gas recirculation mechanism, i.e., the degree of clogging of the EGR valve 22 or the exhaust gas recirculation passage 21. The calculation of IGLOG is described in further detail below with reference to FIG. 14.

The CPU 5*b* supplies a drive signal for each fuel injection valve 6 and an ignition signal for each spark plug 13 according to the fuel injection period TOUT and the ignition timing IGLOG calculated above, through the output circuit 5*d* to each fuel injection valve 6 and each spark plug 13. The CPU 5*b* also supplies a drive signal for the EGR valve 22 through the output circuit 5*d* to the EGR valve 22.

Figure 2:
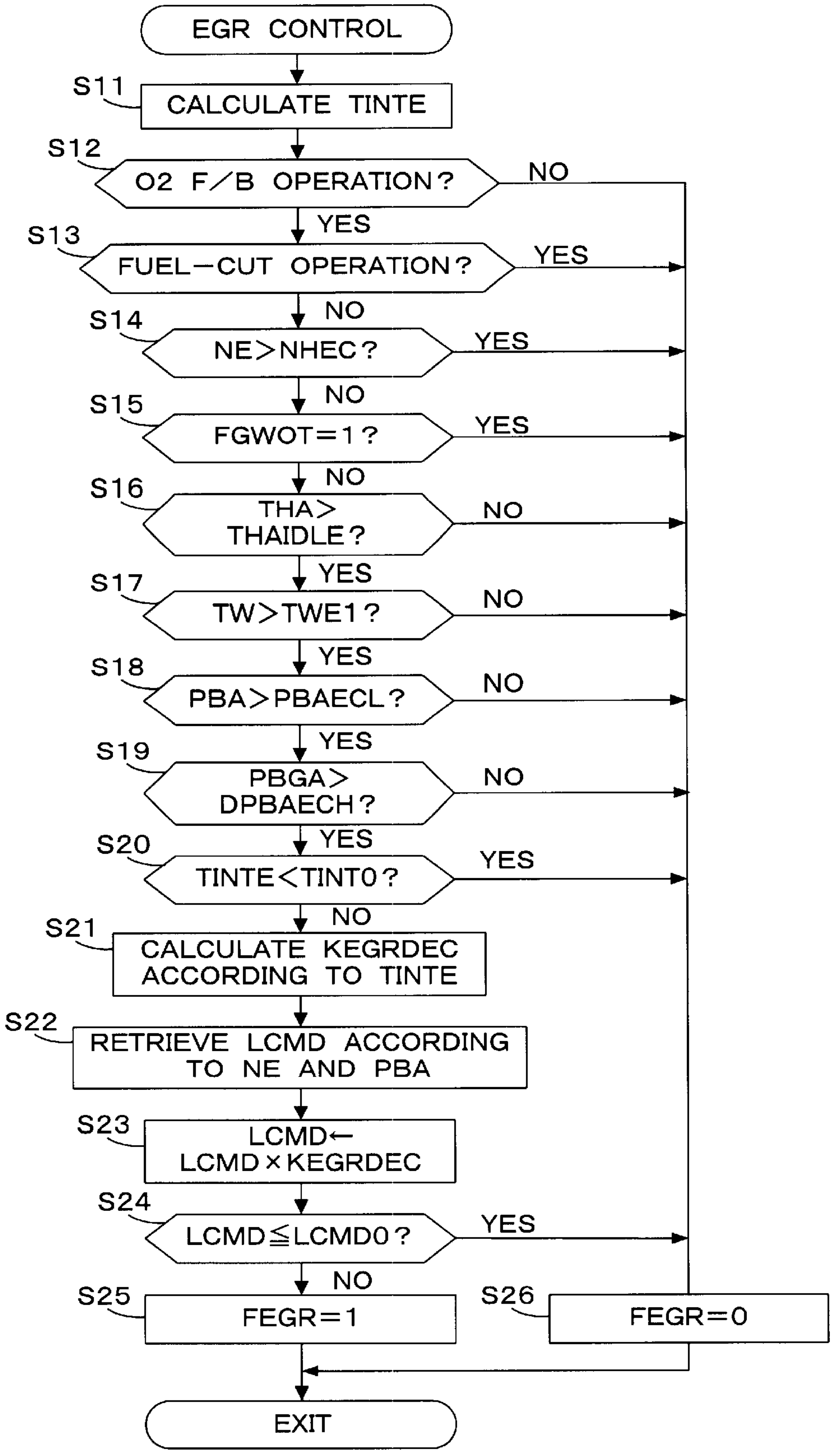
FIG. 2 is a flowchart showing a program for executing exhaust gas recirculation control.

FIG. 2 is a flowchart showing a program for exhaust gas recirculation control. This program is executed by the CPU 5*b* in synchronism with the generation of a TDC signal pulse.

At step S11, an estimated temperature of the intake pipe 2 (which temperature will be hereinafter referred to as "estimated intake pipe temperature") TINTE is calculated from Eq. (3) shown below.

$$TINTE=TINTE(n-1)+TINAIR+TINTS \qquad \text{Eq.(3)}$$

TINTE(n−1) is a preceding calculated value of the estimated intake pipe temperature TINTE, i.e., from a previous iteration of Eq. (3). TINAIR is an intake air parameter indicating an influence of intake air and defined by Eq. (4) shown below. TINTS is an ambient temperature parameter indicating an influence of an ambient temperature of the intake pipe and defined by Eq. (5) shown below. The initial value of the estimated intake pipe 2 temperature TINTE is set to the intake air temperature TA.

$$TINAIR=(TA-TINTE(n-1))\times(TIM\times NE)\times KAIR \qquad \text{Eq.(4)}$$

$$TINTS=(TINTSE-TINTE(n-1))\times KSUR \qquad \text{Eq.(5)}$$

In Eq. (4), TA is a detected intake air temperature, (TIM×NE) is a parameter proportional to an intake air amount per unit time, and KAIR is an averaging coefficient. In Eq. (5), KSUR is an averaging coefficient, and TINTSE is an estimated ambient temperature of the intake pipe defined by Eq. (6) shown below.

$$TINTSE=TINTSE(n-1)+(TW-TINTSE(n-1))+(TA-TINTSE(n-1))\times VP\times KCR \qquad \text{Eq.(6)}$$

In Eq. (6), TINTSE(n−1) is a preceding value of the estimated ambient temperature TINTSE, i.e. from a previous iteration of Eq. (6). TW is an engine coolant temperature VP is a vehicle speed, and KCR is a correction coefficient.

The estimated intake pipe temperature TINTE calculated in step S11 is referred to in steps S20 and S21.

Next, it is determined whether or not the engine 1 is operating in a predetermined operating condition where the condition for execution of exhaust gas recirculation is satisfied. More specifically, if any of the following conditions (in steps S12–S20) are met: (step S12) if the air-fuel ratio feedback control using the O2 sensor 14 is not performed, (step S13) if the engine 1 is in a fuel-cut operation for cutting off the fuel supply to the engine 1, (step S14) if the engine rotational speed NE is higher than a predetermined rotational speed NHEC (e.g., 4500 rpm), which indicates that the engine 1 is rotating at high speeds, (step S15) if a wide-open throttle operation flag FWOT is set to “1”, indicating the fully open condition of the throttle valve 3, (step S16) if the throttle valve opening THA is less than or equal to a predetermined opening THAIDLE, which indicates that the engine 1 is at idling, (step S17) if the engine coolant temperature TW is less than or equal to a predetermined temperature TWEL (e.g., 40 degrees Centigrade) as at cold starting of the engine, (step S18) if the absolute intake pressure PBA is less than or equal to a predetermined pressure PBAECL, which indicates that the engine 1 is in a low-load condition, (step S19) if a pressure difference PBGA (=PA−PBA) between the absolute intake pressure PBA and the atmospheric pressure PA is less than or equal to a predetermined pressure DPBAECH, which indicates that the engine 1 is in a high-load condition, or (step S20) if the estimated intake pipe temperature TINTE calculated in step S11 is lower than a predetermined temperature TINTO (e.g., 0 degrees Centigrade), then the program will proceed to step S26. At step S26, an EGR execution flag FEGR is set to “0” to inhibit the exhaust gas recirculation, so as to prevent a reduction in operational performance of the engine 1 due to the execution of exhaust gas recirculation. The exhaust gas recirculation is inhibited if the estimated intake pipe temperature TINTE is lower than the predetermined temperature TINTO in order to eliminate a possibility that a large quantity of water vapor contained in the recirculated gases may be frozen or condensed by exposure to the intake air of a very low temperature to partially or fully close the intake pipe 2.

Figure 3:
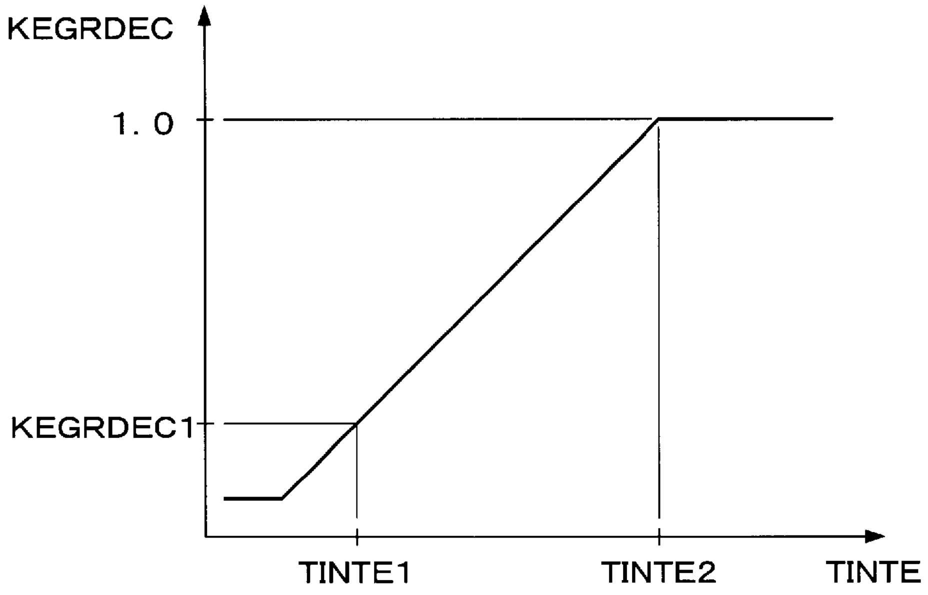
FIG. 3 is a graph showing a table used in the processing of FIG. 2.

In contrast, if none of the preceding conditions are met, then it is determined that the execution condition for exhaust gas recirculation is satisfied, and the program proceeds to step S21. At step S21, a KEGRDEC table, such as the table shown in FIG. 3, is retrieved according to the estimated intake pipe temperature TINTE to calculate an intake pipe temperature correction coefficient KEGRDEC.

The KEGRDEC table is set so that the correction coefficient KEGRDEC increases with an increase in the estimated intake pipe temperature TINTE. Referring to FIG. 3, TINTE1 and TINTE2 denote predetermined temperatures set respectively to 3 degrees Centigrade and 50 degrees Centigrade, for example, and KEGRDEC1 denotes a predetermined coefficient value set to about 0.25. When the estimated intake pipe temperature TINTE is greater than or equal to the predetermined temperature TINTO and lower than the predetermined temperature TINTE2, it is desirable to reduce the exhaust gas recirculation amount. Accordingly, when TINTE is lower than TINTE2, the exhaust gas recirculation amount is corrected to be reduced by the correction coefficient KEGRDEC.

At step S22, an LCMD map (not shown) is retrieved according to the engine rotational speed NE and the absolute intake pressure PBA to calculate a valve lift command value LCMD for the EGR valve 22. Next, at step S23, the valve lift command value LCMD is multiplied by the correction coefficient KEGRDEC to correct the valve lift command value LCMD. Next, at step S24, it is determined whether or not the valve lift command value LCMD corrected in step S23 is less than or equal to a predetermined minute valve lift amount LCMD0. If LCMD is less than or equal to LCMD0, it is decided not to execute EGR, and the program proceeds to step S26. If LCMD is greater than LCMD0, then the program proceeds to step S25, and the EGR execution flag FEGR is set to “1” indicating that the execution condition of the EGR is satisfied. This program ends after steps S25 and S26.

Figure 4:
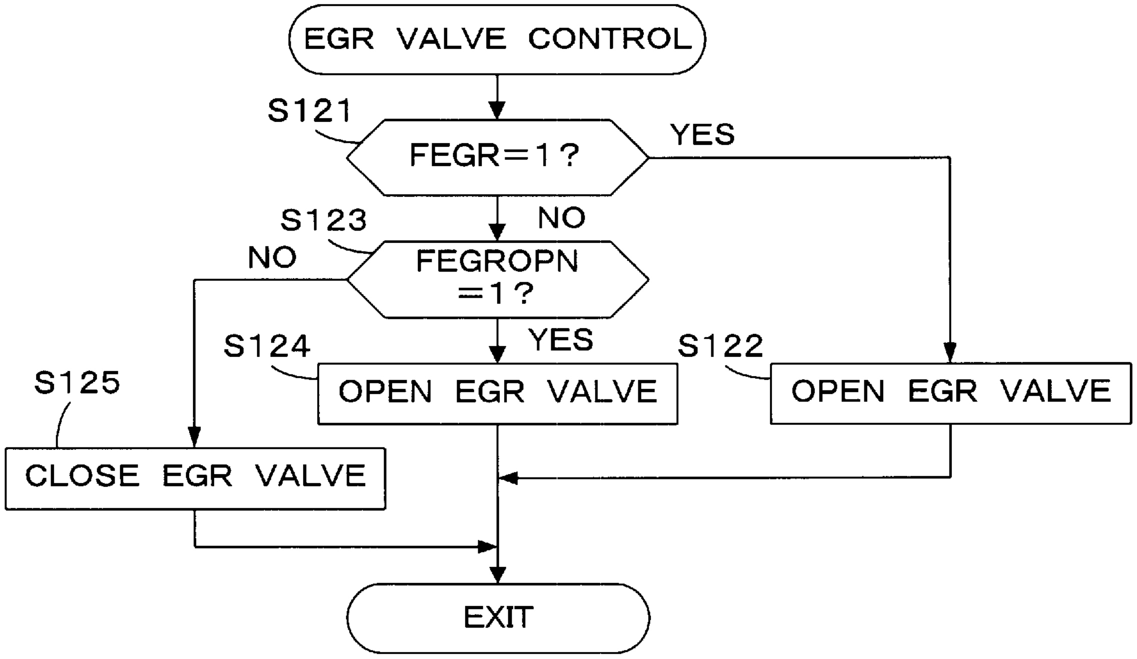
FIG. 4 is a flowchart showing a program for opening and closing an exhaust gas recirculation valve.

FIG. 4 is a flowchart showing a program for opening and closing the EGR valve 22 according to the EGR execution flag FEGR and a valve opening command flag FEGROPN set by EGR flow monitoring processing (FIG. 5) to be hereinafter described. This program is executed by the CPU **5*b* in synchronism with the generation of the TDC signal pulse. The valve opening command flag FEGROPN is set to “1” when the EGR valve 22 is temporarily opened during the fuel-cut operation, so as to determine a decrease in EGR flow due to clogging of the EGR valve 22 or the exhaust gas recirculation passage 21**.

At step S121, it is determined whether or not the EGR execution flag FEGR is “1”. If FEGR is “1”, then the program proceeds to step S122 and the EGR valve 22 is opened according to the valve lift command value LCMD calculated in step S23 shown in FIG. 2.

If FEGR is “0”, the program proceeds to step S123 and it is then determined whether or not the flag FEGROPN is “1”. If FEGROPN is “0”, the program proceeds to step S125 and the EGR valve 22 is closed. If FEGROPN is “1”, the EGR valve 22 is opened to a predetermined valve lift amount. The program ends after steps S124 and S125.

Figure 5:
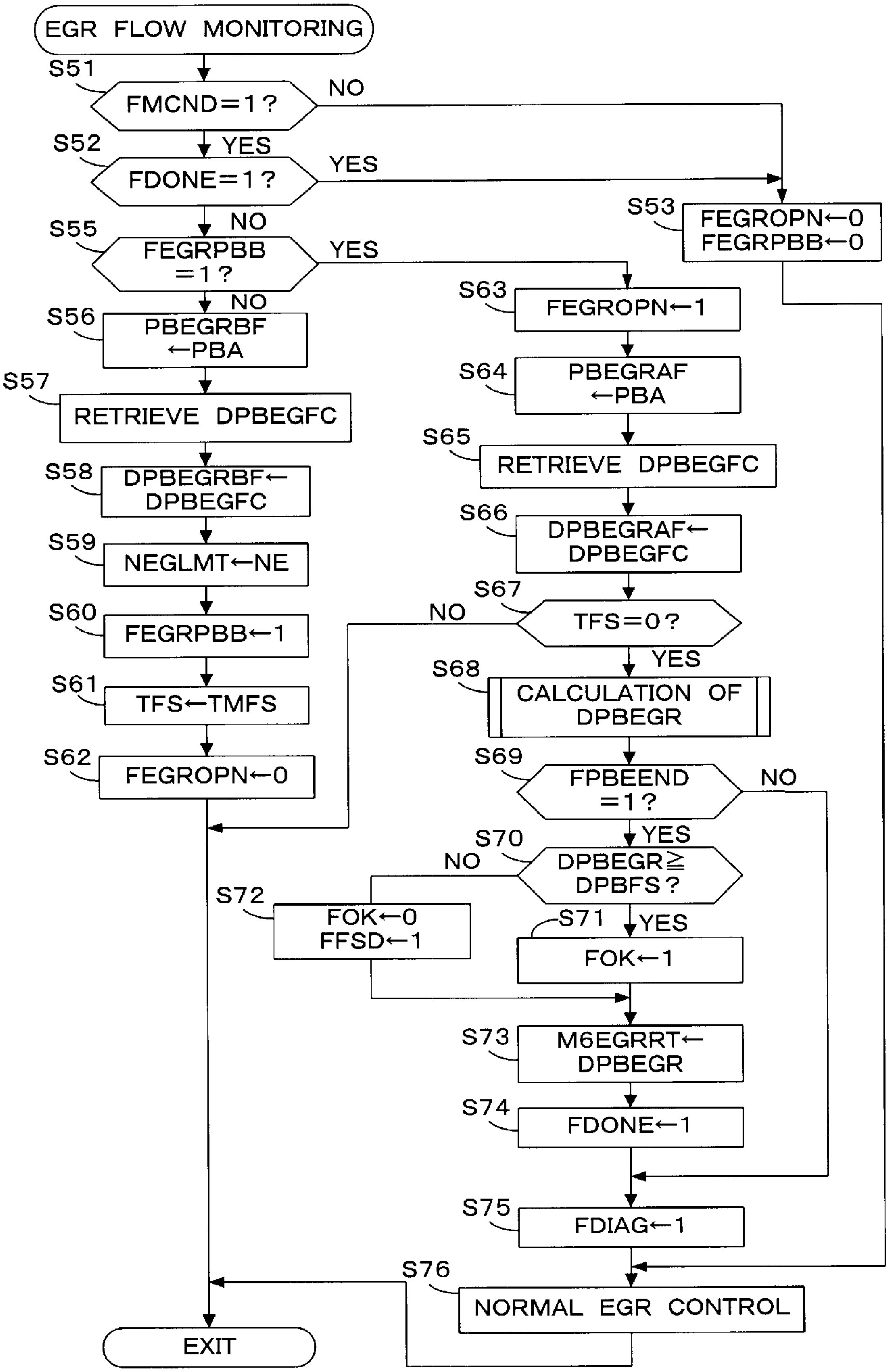
FIG. 5 is a flowchart showing a program for monitoring an exhaust gas recirculation flow.

FIG. 5 is a flowchart showing a program for monitoring a flow in the exhaust gas recirculation passage 21. This program is executed by the CPU **5*b*** every time the TDC signal pulse is generated.

At step S51, it is determined whether or not a monitoring permission flag FMCND is “1”, indicating that the execution of flow monitoring is permitted. The monitoring permission flag FMCND is set in the program shown in FIG. 8 described below. If FMCND is “0”, the program proceeds to step S53 wherein the valve opening command flag FEGROPN is set to “0” and an intake pressure measurement end flag FEGRPBB is set to “0”. The flag FEGRPBB indicates when set to “1” that the measurement of an absolute intake pressure PBA before opening of the EGR valve 22 is finished. The program proceeds to step S76, and normal EGR control is performed. The program ends after step S76.

If the monitoring permission flag FMCND is “1” in step S51, the program proceeds to step S52 wherein it is determined whether or not a determination end flag FDONE is “1”. The flag FDONE indicates when set to “1” that the determination of whether the EGR flow is normal or abnormal is finished. If FDONE is “1”, the program proceeds to step S53.

Figure 6:
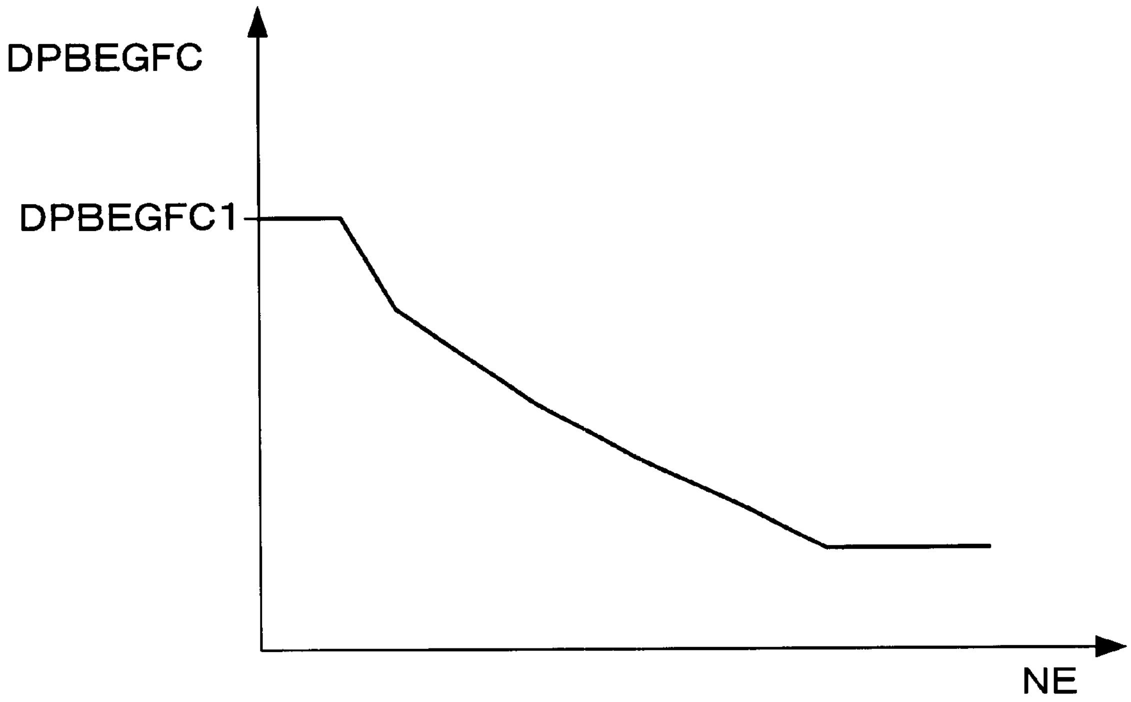
FIG. 6 is a graph showing a table used in the processing of FIG. 5.

If FDONE is “0”, the program proceeds to step S55, and it is determined whether or not the intake pressure measurement end flag FEGRPBB is "1". Since FEGRPBB is initially "0", the program initially proceeds to step S56, and the present absolute intake pressure PBA is stored as a before-valve-opening intake pressure PBEGRBF (hereinafter referred to as "BVO intake pressure PBEGRBF"). Next, at step S57, the DPBEGFC table shown in FIG. 6 is retrieved according to the engine rotational speed NE to calculate a correction value DPBEGFC. The DPBEGFC table is set so that the correction value DPBEGFC increases with a decrease in the engine rotational speed NE. Next, at step S58, this correction value DPBEGFC is stored as a before-valve-opening correction value DPBEGRBF (hereinafter referred to as "BVO correction value DPBEGRBF"), and the program proceeds to step S59. The BVO correction value DPBEGRBF is used in step S68 described below.

At step S59, the present engine rotational speed NE is stored as a before-valve-opening engine rotational speed NEGLMT (hereinafter referred to as "BVO engine rotational speed NEGLMT"). Next, at step S60, the intake pressure measurement end flag FEGRPBB is set to "1". A down-count timer TFS to be referred in step S67 is set to a predetermined time TMFS (e.g., 2 seconds) and then started at step S61. Next, at step S62, the valve opening command flag FEGROPN is set to "0". Thereafter, this program ends.

If the intake pressure measurement end flag FEGRPBB is set to "1" at step S55, i.e., after the intake pressure measurement end flag FEGRPBB is set to "1" in step S60, the program proceeds from step S55 to step S63. At step S63, the valve opening command flag FEGROPN is set to "1". Next, at step S64, the present absolute intake pressure PBA is stored as an after-valve-opening intake pressure PBEGRAF (hereinafter referred to as "AVO intake pressure PBEGRAF"). As in step S57, at step S65, the DPBEGFC table shown in FIG. 6 is retrieved according to the engine rotational speed NE to calculate a correction value DPBEGFC. This correction value DPBEGFC is stored as an after-valve-opening correction value DPBEGRAF (hereinafter referred to as "AVO correction value DPBEGRAF") at step S66.

At step S67, it is determined whether or not the count value of the timer TFS started in step S61 is "0". If TFS is greater than "0", then the program immediately ends. If TFS is "0", then at step S68, the DPBEGR calculation processing shown in FIG. 7 is executed to calculate an intake pressure change amount DPBEGR.

Figure 7:
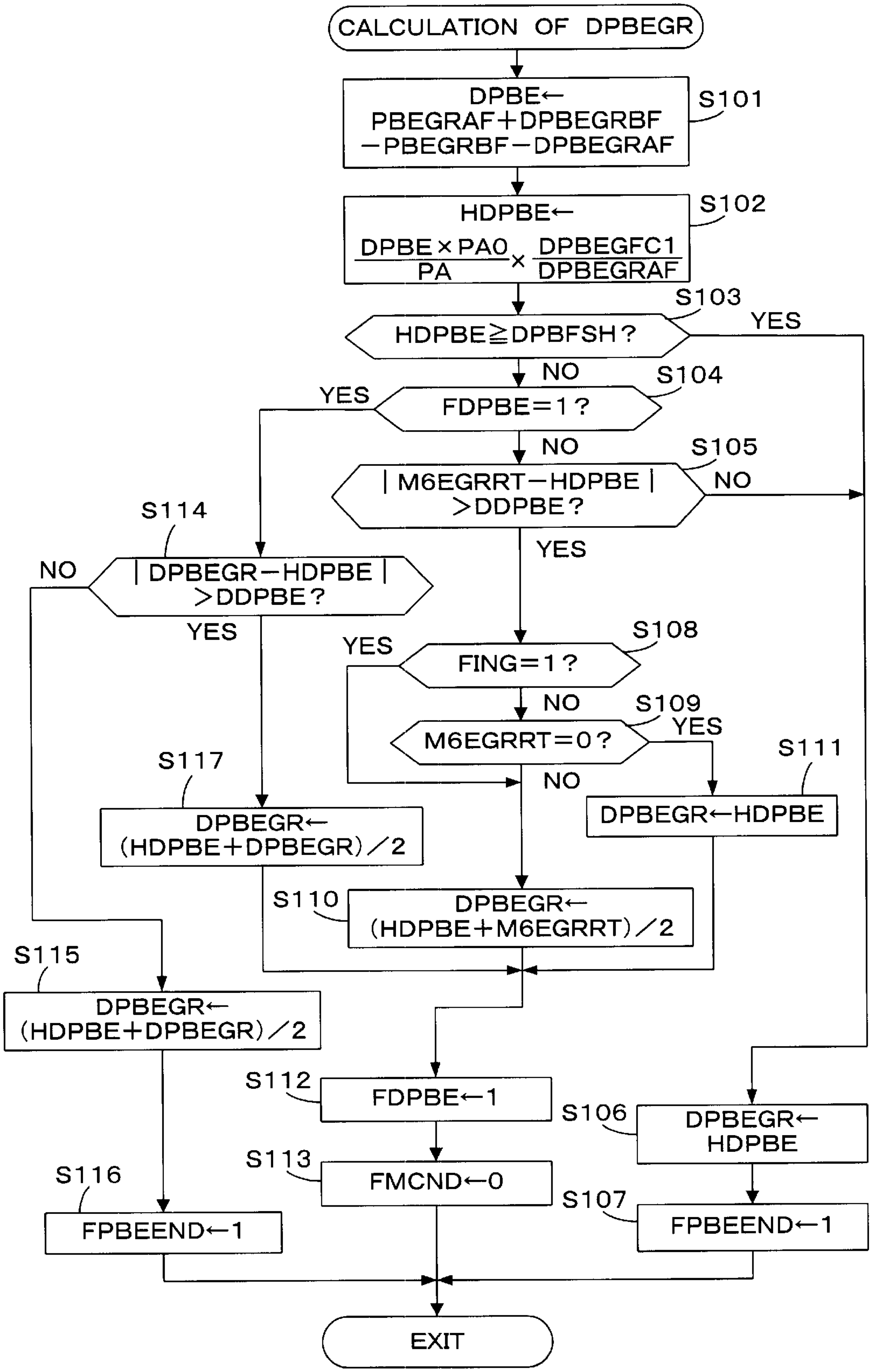
FIG. 7 is a flowchart showing a program for calculating an intake pressure change (DPBEGR) to be referred in the processing of FIG. 5.

Referring to FIG. 7, at step S101, the AVO intake pressure PBEGRAF, the BVO intake pressure PBEGRBF, the AVO correction value DPBEGRAF, and the BVO correction value DPBEGRBF are applied to Eq. (7) shown below to correct an intake pressure change amount (PBEGRAF PBEGRBF) between the intake pressure PBA before opening the EGR valve 22 and the intake pressure PBA after opening the EGR valve 22, by using the correction values DPBEGRBF and DPBEGRAF according to the engine rotational speed NE, thereby calculating a first corrected change amount DPBE.

$$DPBE=PBEGRAF+DPBEGRBF-PBEGRBF-DPBEGRAF \quad \text{Eq.(7)}$$

The correction values DPBEGRBF and DPBEGRAF are used to eliminate an influence of a change in the engine rotational speed NE upon the absolute intake pressure PBA.

At step S102, a second corrected change amount HDPBE is calculated from Eq. (8) shown below.

$$HDPBE=DPBE\times(\mathrm{PAO}/PA)\times(\mathrm{DPBEGFC1}/DPBEGRAF) \quad \text{Eq.(8)}$$

PA is the present atmospheric pressure, PAO is a reference atmospheric pressure (e.g., 101.3 kPa), and DPBEGFC1 is a correction value for a low value applied when the engine rotational speed NE is low as shown in FIG. 6. By multiplying the first corrected change amount DPBE by (PAO/PA), the influence of the atmospheric pressure PA is eliminated, and by multiplying (DPBEGFC1/DPBEGRAF), the influence of the present engine rotational speed NE is eliminated.

At step S103, it is determined whether or not the second corrected change amount HDPBE is greater than or equal to a predetermined change amount DPBFSH. The predetermined change amount DPBFSH is set to a value (e.g., 5.3 kPa (40 mmHg)) greater than the determination threshold DPBFS referred in step S70 shown in FIG. 5. If HDPBE is greater than or equal to DPBFSH, the intake pressure change amount DPBEGR is set to the second corrected change amount HDPBE at step S106, and a change calculation end flag FPBEEND is set to "1" at step S107, indicating that the calculation of the intake pressure change amount DPBEGR is finished. After step S107, this program ends.

If HDPBE is less than DPBFSH in step S103, it is determined whether or not an interruption flag FDPBE is "1" at step S104. The flag FDPBE being set to "1" is an indication that the EGR flow monitoring was interrupted. Since FDPBE is "0" initially, the program initially proceeds to step S105. At step S105, it is determined whether or not the absolute value of a difference (M6EGRRT−HDPBE) between the stored value M6EGRRT of the intake pressure change amount stored at the time of finishing the execution of EGR flow monitoring in the previous cycle (see step S73 in FIG. 5) and the second corrected change amount HDPBE, is greater than a predetermined difference DDPBE (e.g., 0.4 kPa (3 mmHg)).

If the absolute value of the difference (M6EGRRT−HDPBE) is less than or equal to DDPBE, the program proceeds to step S106. If the absolute value of the difference (M6EGRRT−HDPBE) is greater than DDPBE, processing proceeds step S108 where it is determined whether or not an initialization flag FING is "1". The flag FING indicates when set to "1" that a backup memory for retaining stored contents even after turning off an ignition switch is initialized. If FING is "1", the program proceeds directly to step S110. If FING is "0", it is determined whether or not the stored value M6EGRRT is "0" at step S109. If M6EGRRT is "0", the intake pressure change amount DPBEGR is set to the second corrected change amount HDPBE at step S111, and the program proceeds to step S112. If M6EGRRT is greater than "0", the program proceeds to step S110, in which the intake pressure change amount DPBEGR is set to the average of the second corrected change amount HDPBE and the stored value M6EGRRT.

At step S112, the interruption flag FDPBE is set to "1". Then, at step S113, the monitoring permission flag FMCND is returned to "0", and this program ends. After the monitoring permission flag FMCND is returned to "0", the answer to step S51 shown in FIG. 5 becomes negative (NO). Accordingly, the EGR flow monitoring is interrupted and the next chance of diagnosis is awaited.

When the EGR flow monitoring is executed again in the condition where the interruption flag FDPBE is set to "1", the answer to step S104 becomes affirmative (YES) and the program proceeds to step S114. At step S114, it is determined whether or not the absolute value of a difference (DPBEGR−HDPBE) between the intake pressure change amount DPBEGR calculated at the previous execution of monitoring and the second corrected change amount HDPBE is greater than the predetermined difference DDPBE. If the absolute value of the difference (DPBEGR−

HDPBE) is greater than DDPBE, the intake pressure change amount DPBEGR is set to the average of the second corrected change amount HDPBE and the previously calculated value DPBEGR of the intake pressure change amount at step S117. Next, the program proceeds to step S112.

If the absolute value of the difference (DPBEGR−HDPBE) is less than or equal to DDPBE, the intake pressure change amount DPBEGR is set to the average of the second corrected change amount HDPBE and the previously calculated value DPBEGR of the intake pressure change amount at step S115, and the change calculation end flag FPBEEND is set to "1" at step S116. After step S116, this program ends.

The processing of FIG. 7 is summarized as follows:

1) If the second corrected change amount HDPBE is greater than or equal to the predetermined change amount DPBFSH, or if the absolute value of the difference between the stored value M6EGRRT and the second corrected change amount HDPBE is less than or equal to the predetermined difference DDPBE in the condition where the flow monitoring is not interrupted (in the condition where the flag FDPBE is "0"), then the second corrected change amount HDPBE is adopted as the intake pressure change amount DPBEGR (step S106). In this case, the change calculation end flag FPBEEND is set to "1".
2) If the absolute value of the difference between the stored value M6EGRRT and the second corrected change amount HDPBE is greater than the predetermined difference DDPBE in the condition where the flow monitoring is not interrupted (in the condition where the flag FDPBE is "0"), then the second corrected change amount HDPBE or the average of the stored value M6EGRRT and the second corrected change amount HDPBE, is calculated as the intake pressure change amount DPBEGR (steps S110, S111). However, since the calculated value of the intake pressure change amount DPBEGR has poor reliability, the determination of whether the EGR flow is normal or abnormal is suspended to interrupt the flow monitoring (step S112). In this case, the change calculation end flag FPBEEND is maintained at "0".
3) If the absolute value of the difference between the previous calculated value of the intake pressure change amount DPBEGR and the second corrected change amount HDPBE is less than or equal to the predetermined difference DDPBE after interrupting the flow monitoring (in the condition of FDPBE is "1"), then the average of the previous calculated value DPBEGR and the second corrected change amount HDPBE is adopted as the present intake pressure change amount DPBEGR (step S115). In this case, the change calculation end flag FPBEEND is set to "1".
4) If the absolute value of the difference between the previous calculated value of the intake pressure change amount DPBEGR and the second corrected change amount HDPBE is greater than the predetermined difference DDPBE after interrupting the flow monitoring (in the condition of FDPBE is "1"), then the average of the previous calculated value DPBEGR and the second corrected change amount HDPBE is calculated as the present intake pressure change amount DPBEGR (step S117). However, since this calculated value of the intake pressure change amount DPBEGR lacks reliability, the determination of whether the EGR flow is normal or abnormal is suspended to interrupt the flow monitoring again (step S112). In this case, the change calculation end flag FPBEEND is maintained at "0".

Referring back to FIG. 5, it is determined whether or not the change calculation end flag FPBEEND is "1" in step S69. If FPBEEND is "0", which indicates that the interruption of the flow monitoring is determined, the program proceeds directly to step S75.

If FPBEEND is "1", the program proceeds to step S70, and it is determined whether or not the calculated intake pressure change amount DPBEGR is greater than or equal to a determination threshold DPBFS (e.g., 2.7 kPa (20 mmHg)). If DPBEGR is greater than or equal to DPBFS, the program proceeds to step S71. At step S71, it is determined that the EGR flow is normal to set an OK flag FOK to "1", indicating the normality of the EGR flow.

If DPBEGR is less than DPBFS, it is determined that the EGR flow is abnormal, i.e., that the level of clogging of the exhaust gas recirculation passage 21 or the EGR valve 22 has reached an abnormal level. As a result, the OK flag FOK is set to "0" and an NG flag FFSD is set to "1" at step S72, indicating the abnormality of the EGR flow.

At step S73, the intake pressure change amount DPBEGR calculated in step S68 is stored as a stored value M6EGRRT into the backup memory. Then, at step S74, the determination end flag FDONE is set to "1", and the program proceeds to step S75.

At step S75, a monitoring end flag FDIAG is set to "1", indicating that the execution of the flow monitoring is finished, and the program proceeds to step S76. The monitoring end flag FDIAG is referred to in the processing of FIG. 10 described below.

According to the processing of FIG. 5, the intake pressure change amount DPBEGR is calculated by the processing of FIG. 7 according to the pressure difference (PBEGRAF−PBEGRBF) between the intake pressure PBEGRBF before opening the EGR valve 22 and the intake pressure PBEGRAF after opening the EGR valve 22. If the intake pressure change amount DPBEGR thus calculated is less than the determination threshold DPBFS, it is determined that the EGR flow is abnormal.

Figure 8:
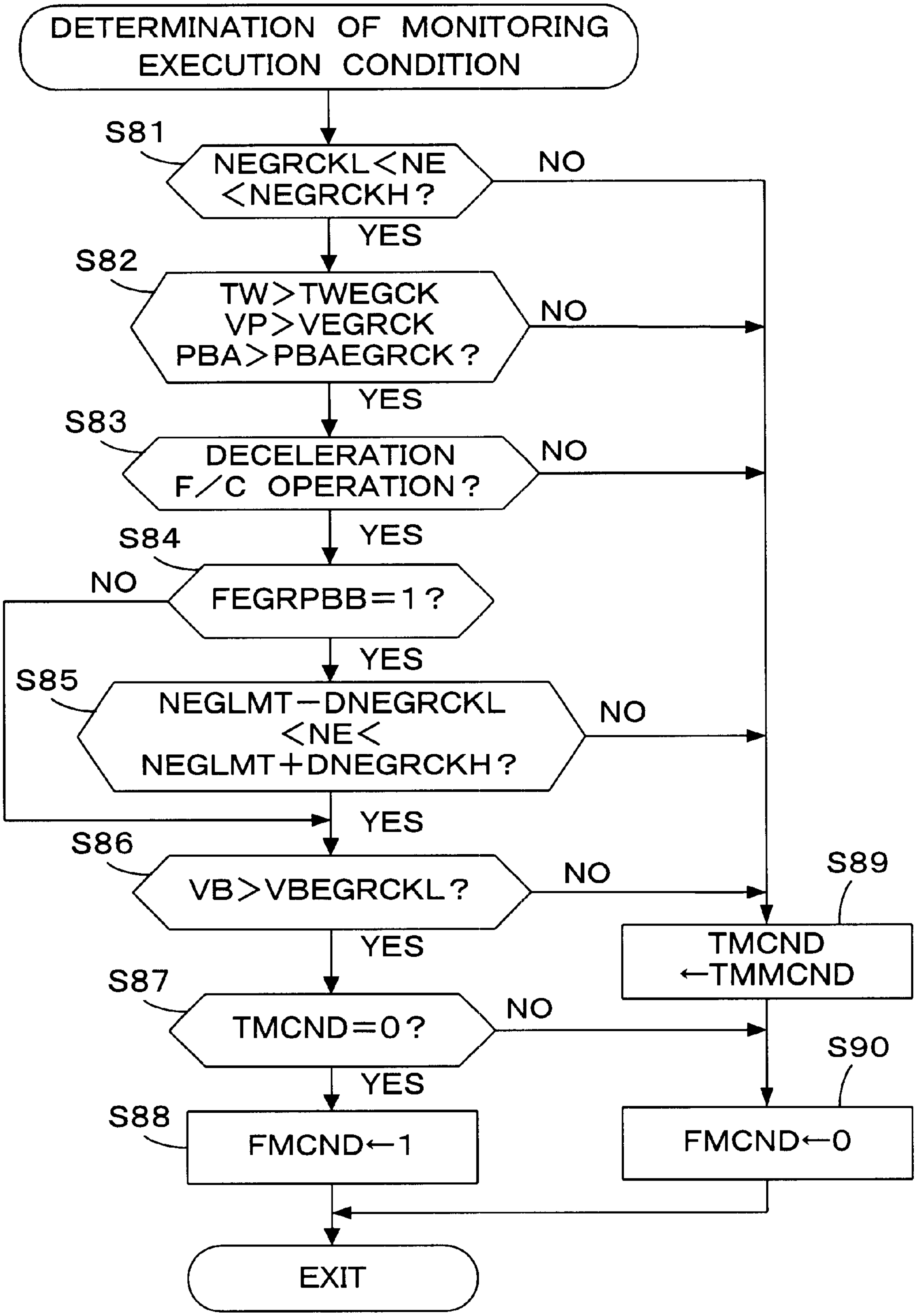
FIG. 8 is a flowchart showing a program for determining the execution conditions of exhaust gas recirculation flow monitoring.

FIG. 8 is a flowchart showing a program for determining the execution conditions of monitoring to set the monitoring permission flag FMCND which is referred to in step S51 shown in FIG. 5. This program is executed by the CPU 5*b* in synchronism with the generation of the TDC signal pulse.

At step S81, it is determined whether or not the engine rotational speed NE is in the range between a predetermined upper limit NEGRCKH (e.g., 2000 rpm) and a predetermined lower limit NEGRCKL (e.g., 1400 rpm). If NE is lower than or equal to NEGRCKL or NE is higher than or equal to NEGRCKH, at step S89, a down-count timer TMCND is set to a predetermined time TMMCND (e.g. 2 seconds) and then started. Next, at step S90, the monitoring permission flag FMCND is set to "0". Thereafter, the program ends.

If NE is higher than NEGRCKL and lower than NEGRCKH, the program proceeds to step S82. At step S82, it is determined whether or not the engine coolant temperature TW is higher than a predetermined temperature TWEGCK (e.g., 70 degrees Centigrade), whether or not the vehicle speed VP is higher than a predetermined speed VEGRCK (e.g., 56 km/h), and whether or not the absolute intake pressure PBA is higher than a predetermined pressure PBAEGRCK (e.g., 15 kPa). If the answer to step S82 is negative (NO), the program proceeds to step S89. If the answer to step S82 is affirmative (YES), the program proceeds to step S83 and it is determined whether or not the vehicle is in a deceleration fuel-cut operation such that the vehicle is decelerating and the fuel supply to the engine 1 is interrupted. If the vehicle is not in the deceleration fuel-cut operation, the program proceeds to step S89. If the vehicle is in the deceleration fuel-cut operation, the program proceeds to step S84 and it is determined whether or not the intake pressure measurement end flag FEGRPBB set in the processing of FIG. 5 is "1". While the monitoring permission flag FMCND is "0", the flag FEGRPBB is "0", and the program proceeds directly to step S86.

On the other hand, since the flag FEGRPBB is "1" while the flow monitoring is being executed, the program proceeds to step S85. At step S85, it is determined whether or not the engine rotational speed NE is in the range between a lower limit (=NEGLMT+DNEGRCKL) and an upper limit (=NEGLMT+DNEGRCKH). NEGLMT is the BVO engine rotational speed as stored in step S59 shown in FIG. 5, and DNEGRCKL and DNEGRCKH are predetermined rotational speeds set respectively to 128 rpm and 64 rpm, for example.

If the answer to step S85 is negative (NO), it is determined that the engine rotational speed NE has rapidly changed from the BVO engine rotational speed NEGLMT, causing a high possibility of improper determination. Therefore, the program proceeds to step S89, so as to interrupt the flow monitoring.

If the answer to step S85 is affirmative (YES), the program proceeds to step S86, in which it is determined whether or not a battery voltage VB is higher than a predetermined voltage VBEGRCKL (e.g., 11 V). If VB is lower than or equal to VBEGRCKL, the program proceeds to step S89. If VB is greater than VBEGRCKL, then at step S87, it is determined whether or not the value of the timer TMCND is "0". If TMCND is greater than "0", the program proceeds to step S90. If TMCND is "0", the program proceeds to step S88 and the monitoring permission flag FMCND is set to "1" to permit execution of the flow monitoring.

FIGS. 9A to 9D are time graphs for illustrating the operation by the processes of FIGS. 5 and 8. When the deceleration fuel-cut operation is started at time t1, the monitoring permission flag FMCND is set to "1" slightly before time t2 to perform the measurement of the BVO intake pressure PBEGRBF, and a valve opening command to the EGR valve 22 is issued at time t2 (FIG. 9C). As a result, the actual valve lift amount LACT of the EGR valve 22 gradually increases as shown in FIG. 9D, and the absolute intake pressure PBA also gradually increases. At time t3, the measurement of the AVO intake pressure PBEGRAF is performed and a valve closing command to the EGR valve 22 is issued to end the flow monitoring.

FIG. 10 is a flowchart showing a program for setting an engine control flag FWTEGR which is referred to in the fuel supply control and the ignition timing control of the engine 1. This program is executed by the CPU 5*b* in synchronism with the generation of the TDC signal pulse.

In step S131, it is determined whether or not the EGR execution flag FEGR is "1". If FEGR is "0", which indicates that the execution conditions of exhaust gas recirculation are not satisfied, the program proceeds to step S152, wherein a down-count timer TDLY is set to a predetermined delay time TMDLY and then started. Next, at step S133, an accumulated value ΣLACT of actual valve lift amounts LACT of the EGR valve 22 is set to "0", and then at step S138, the engine control flag FWTEGR is set to "0". The flag FWTEGR indicates when set to "1" that the engine control corresponding to execution of the exhaust gas recirculation is performed. Thereafter, the program ends.

If FEGR is "1" in step S131, which indicates that the execution condition of exhaust gas recirculation is satisfied, processing proceeds to step S134, wherein it is determined whether or not the monitoring end flag FDIAG set in step S75 shown in FIG. 5 is "1". Normally, FDIAG is "0". Next, the program proceeds to step S135, in which it is determined whether or not the value of the timer TDLY is "0". If TDLY is greater than "0", the program proceeds to step S138. In other words, during the predetermined delay time TMDLY immediately after satisfaction of the execution condition of the exhaust gas recirculation, engine control corresponding to non-execution of the exhaust gas recirculation is continued. Thereafter, if TDLY becomes "0", the program proceeds to step S140, and the engine control flag FWTEGR is set to "1"to perform the engine control corresponding to execution of the exhaust gas recirculation.

When the EGR flow monitoring is executed during the deceleration fuel-cut operation by the processing of FIG. 5, the monitoring end flag FDIAG is set to "1"in step S75 both in the case that the determination is finished (in the case that the determination end flag FDONE is set to "1") and in the case that the determination is suspended to interrupt the monitoring (in the case that the flag FPBEEND remains at "0"). In these cases, the answer to step S134 becomes affirmative (YES), and the program proceeds step S176, wherein the accumulated value ΣLACT of actual valve lift amounts is calculated from Eq. (9) shown below.

$$\Sigma LACT = \Sigma LACT + LACT \qquad \text{Eq. (9)}$$

Next, at step S137, it is determined whether or not the accumulated value ΣLACT is greater than a predetermined value ILACT0. Since ΣLACT is less than or equal to ILACT0 at first, the program proceeds to step S138. If ΣLACT is greater than ILACT0, the program proceeds to step S139, wherein the timer TDLY is set to "0". Next, the program proceeds to step S140, in which the engine control flag FWTEGR is set to "1" and the monitoring end flag FDIAG is returned to "0". Accordingly, the program in the subsequent cycles proceeds from step S134 to step S140, via step S135.

According to the processes of FIG. 10, if the execution condition of the exhaust gas recirculation is first satisfied after the end of the EGR flow monitoring, then the engine control corresponding to non-execution of the exhaust gas recirculation is continued until the accumulated value ΣLACT of actual valve lift amounts reaches the predetermined value ILACT0.

This result is because of the following reason. Since the EGR flow monitoring is executed during the fuel-cut operation, the exhaust gas recirculation passage 21 is therefore filled with air during the fuel-cut operation. Therefore, the air, rather than exhaust gases, flows from the exhaust gas recirculation passage 21 into the intake pipe 2, when the EGR valve 22 is first opened after the end of the EGR flow monitoring. In other words, at the time the accumulated value ΣLACT reaches the predetermined value ILACT0, it is determined that almost all of the air filling the exhaust gas recirculation passage 21 has flown into the intake pipe 2. Accordingly, by performing the fuel supply control and the ignition timing control according to the engine control flag FWTEGR set by the processing of FIG. 10, it is possible to prevent the air-fuel ratio from becoming leaner than a desired value and to prevent the ignition timing from deviating from an optimum value, which makes it possible to maintain good exhaust emission characteristics and output characteristics of the engine.

Figure 11:
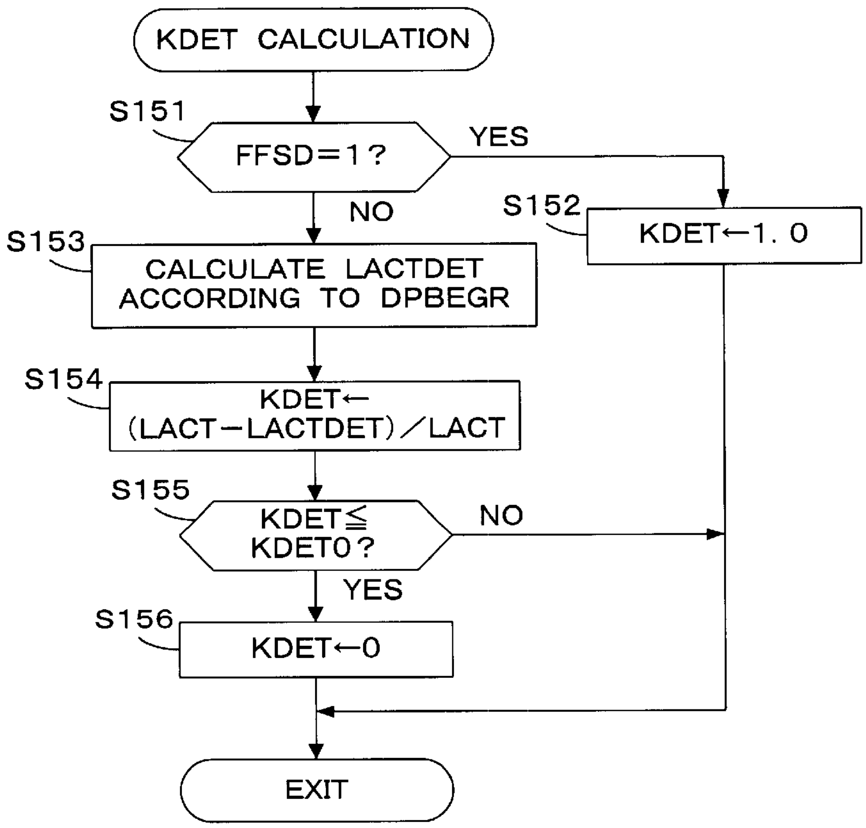
FIG. 11 is a flowchart showing a program for calculating a correction coefficient (KDET) according to the degree of deterioration of an exhaust gas recirculation mechanism.

FIG. 11 is a flowchart showing a program for calculating a deterioration correction coefficient KDET for controlling the engine according to the degree of deterioration of the exhaust gas recirculation mechanism. Even in the case that the EGR flow is determined not to be abnormal, the deterioration of the exhaust gas recirculation mechanism, i.e., the clogging of the EGR valve 22 or the exhaust gas recirculation passage 21 gradually progresses. To cope with this, the deterioration correction coefficient KDET is introduced in this preferred embodiment to perform the engine control according to the degree of deterioration of the exhaust gas recirculation mechanism. The program shown in FIG. 11 is executed by the CPU 5*b* in synchronism with the generation of the TDC signal pulse.

At step S151, it is determined whether or not the NG flag FFSD is "1". If FFSD is "1", the program proceeds step S152, the deterioration correction coefficient KDET is set to "1.0", and then this program ends.

Figure 12:
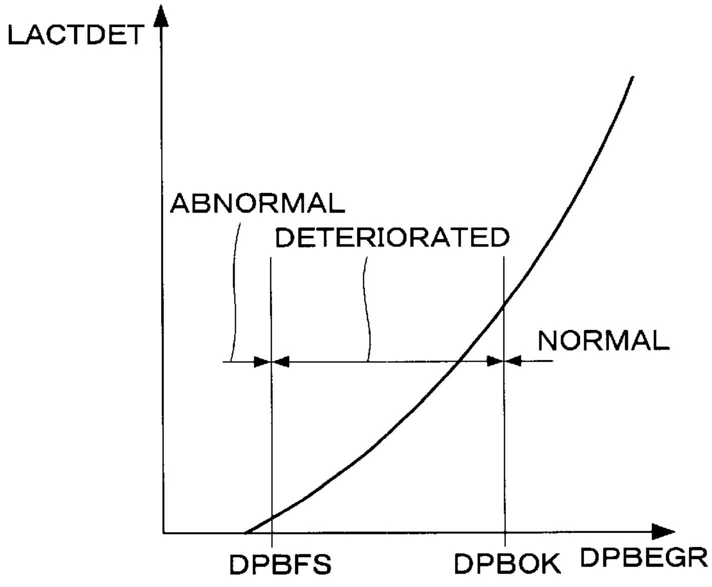
FIG. 12 is a graph showing a table used in the processing of FIG. 11.

If FFSD is "0", which indicates that the EGR flow is not determined to be abnormal, processing proceeds to step S153, and a LACTDET table shown in FIG. 12 is retrieved according to the intake pressure change amount DPBEGR to calculate an effective valve lift amount LACTDET In FIG. 12, the range where DPBEGR is less than DPBFS corresponds to an abnormal range where the EGR flow is determined to be abnormal, the range where DPBEGR is greater than DPBOK corresponds to a normal range where the effective valve lift amount LACTDET is substantially equal to the actual valve lift amount LACT, and the range where DPBEGR is greater than or equal to DPBFS and less than or equal to DPBOK corresponds to a deterioration range where the EGR flow is not determined to be abnormal, but the clogging is in progress. In the processing of FIG. 5, the EGR flow is determined to be "normal" in the deterioration range shown in FIG. 12.

Next, at step S154, the deterioration correction coefficient KDET is calculated from Eq. (10) shown below.

$$KDET=(LACT-LACTDET)/LACT \quad \text{Eq.(10)}$$

If no deterioration occurs, LACT is equal to LACTDET and therefore KDET is equal to "0". The deterioration correction coefficient KDET increases with an increase in the degree of deterioration.

At step S155, it is determined whether or not the deterioration correction coefficient KDET calculated in step S154 is less than or equal to a predetermined value KDET0 which is set to a value slightly greater than "0". If KDET is greater than KDET0, the program immediately ends. If KDET is less than or equal to KDET0, the program proceeds to step S156, and KDET is set to "0", and the program ends.

Figure 13:
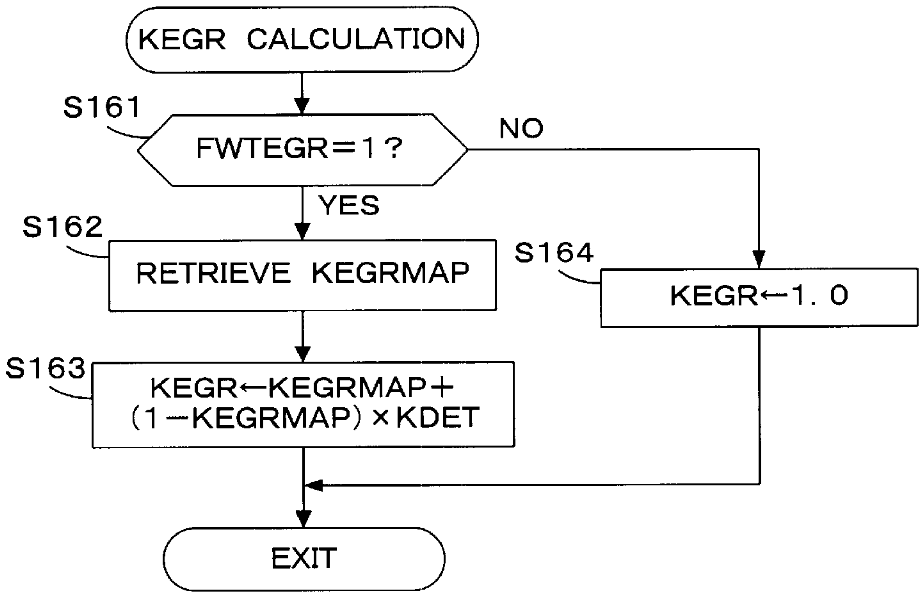
FIG. 13 is a flowchart showing a program for calculating an EGR correction coefficient for correcting a fuel injection period.

FIG. 13 is a flowchart showing a program for calculating the EGR correction coefficient KEGR to be applied to Eq. (1) above. This program is executed by the CPU 5*b* in synchronism with the generation of the TDC signal pulse.

At step S161, it is determined whether or not the engine control flag FWTEGR is "1". If FWTEGR is "0", the program proceeds to step S164, wherein the EGR correction coefficient KEGR is set to 1.0 (non-correction value), and then the program ends.

If FWTEGR is "1", the program proceeds to step S162, and a map set according to the engine rotational speed NE and the absolute intake pressure PBA is retrieved to calculate a map value KEGRMAP. Then, the map value KEGRMAP and the deterioration correction coefficient KDET are applied to Eq. (11) shown below to calculate the EGR correction coefficient KEGR.

$$KEGR=KEGRMAP+(1-KEGRMAP)\times KDET \quad \text{Eq.(11)}$$

According to Eq. (11), if the exhaust gas recirculation mechanism is not deteriorated (KDET is "0"), KEGR is equal to KEGRMAP; if the exhaust gas recirculation mechanism is determined to be abnormal (KDET=1), KEGR is equal to "1"; and if the degree of deterioration of the exhaust gas recirculation mechanism is in the intermediate deterioration range, KEGR is set to a value between the map value KEGRMAP and 1.0 according to the deterioration correction coefficient KDET.

Thus, the EGR correction coefficient KEGR is set according to the engine control flag FWTEGR set by the processing of FIG. 10 rather than according to the EGR execution flag FEGR, thereby preventing the air-fuel ratio from becoming leaner than a desired value at the starting of the EGR immediately after the end of the EGR flow monitoring as described above to maintain good exhaust emission characteristics. Further, by using the deterioration correction coefficient KDET, it is possible to prevent the air-fuel ratio from becoming leaner than a desired value at such a degree of deterioration that the exhaust gas recirculation mechanism is not determined to be abnormal.

Figure 14:
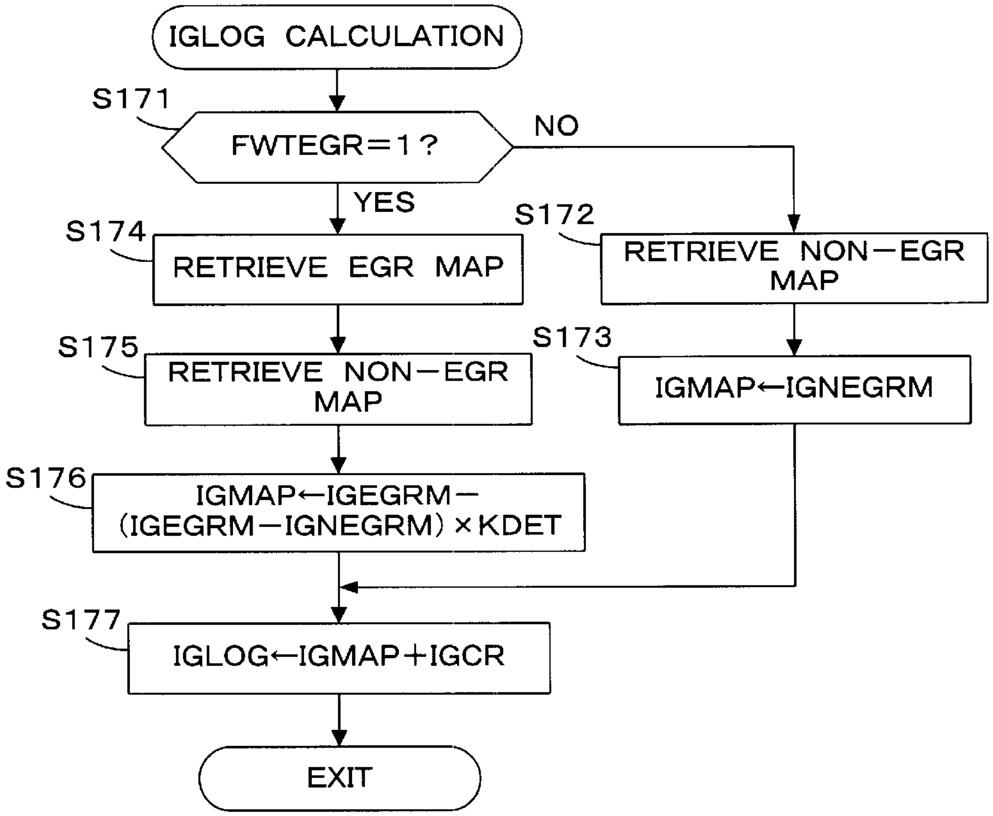
FIG. 14 is a flowchart showing a program for calculating an ignition timing (IGLOG).

FIG. 14 is a flowchart showing a program for calculating the ignition timing IGLOG. This program is executed by the CPU 5*b* in synchronism with the generation of the TDC signal pulse.

At step S171, it is determined whether or not the engine control flag FWTEGR is "1". If FWTEGR is "0", the program proceeds to step S172, wherein a non-EGR map as an ignition timing map suitable for the condition where the exhaust gas recirculation is not executed is retrieved according to the engine rotational speed NE and the absolute intake pressure PBA to calculate a non-EGR map value IGNEGRM. Next, at step S173, the non-EGR map value IGNEGRM is adopted as the map value IGMAP. The program then proceeds to step S177.

At step S177, the ignition timing IGLOG is calculated from Eq. (2) above. Thereafter, the program ends.

If FWTEGR is "1" in step S171, the program proceeds to step S174. At step S174, an EGR map as an ignition timing map suitable for the case where the exhaust gas recirculation is executed is retrieved according to the engine rotational speed NE and the absolute intake pressure PBA to calculate an EGR map value IGEGRM. Next, at step S175, as in step S172, the non-EGR map value IGNEGRM is calculated. Next, at step S176, the EGR map value IGEGRM, the non-EGR map value IGNEGRM, and the deterioration correction coefficient KDET are applied to Eq. (12) shown below to calculate the map value IGMAP. Processing proceeds from step S176 to S177.

$$IGMAP=IGEGRM-(IGEGRM-IGNEGRM)\times KDET \quad \text{Eq.(12)}$$

According to Eq. (12), if the exhaust gas recirculation mechanism is not deteriorated (KDET is "0"), IGMAP is equal to IGEGRM; if the exhaust gas recirculation mechanism is determined to be abnormal (KDET=1), IGMAP is equal to IGNEGRM; and if the degree of deterioration of the exhaust gas recirculation mechanism is in the intermediate deterioration range, IGMAP is set to a value between the EGR map value IGEGRM and the non-EGR map value IGNEGRM according to the deterioration correction coefficient KDET.

Thus, the ignition timing IGLOG is set according to the engine control flag FWTEGR set by the processing of FIG. 10, rather than according to the EGR execution flag FEGR, thereby preventing the ignition timing from deviating from a desired value at the starting of the EGR immediately after finishing the EGR flow monitoring as described above to maintain good engine operating characteristics. Further, by using the deterioration correction coefficient KDET, it is possible to prevent the ignition timing from deviating from a desired value at such a degree of deterioration that the exhaust gas recirculation mechanism is not determined to be abnormal.

In this preferred embodiment, the ECU 5 constitutes control means, fuel supply interrupting means, and abnormality determining means. The ECU 5 also constitutes a control module, a fuel supply interrupting module, and an abnormality determining module. More specifically, the processes of FIGS. 10, 13, and 14 correspond to the control means or the control module, the setting of the fuel injection period TOUT to "0" in the predetermined deceleration operating condition of the engine 1 corresponds to the fuel supply interrupting means or the fuel supply interrupting module, and the processing of FIG. 5 corresponds to the abnormality determining means or the abnormality determining module.

The present invention is not limited to the above preferred embodiment, but various modifications may be made without departing from the scope and spirit of the present invention. For example, in the above-described preferred embodiment, the engine control suitable for non-execution of the exhaust gas recirculation is continued until the accumulated value ΣLACT of actual valve lift amounts reaches the predetermined value ILACT0 when first opening the EGR valve 22 immediately after finishing the EGR flow monitoring. Alternatively, the engine control suitable for the case of not executing EGR may be continued for a predetermined time period from the time of first opening of the EGR valve 22 immediately after finishing the EGR flow monitoring. However, since the time required for supplying all quantity of air in the exhaust gas recirculation passage 21 to flow into the intake pipe 2 is dependent on the actual valve lift amount LACT of the EGR valve 22, the use of the accumulated value ΣLACT of actual valve lifts makes the continuation time of the engine control suitable for non-execution of the EGR more proper depending on the actual EGR flow.

What is claimed is:

1. A control system for controlling an internal combustion engine having an exhaust passage and an intake passage, said control system comprising:

an exhaust gas recirculation mechanism having an exhaust gas recirculation passage connected between said exhaust passage and said intake passage, and an exhaust gas recirculation valve provided in said exhaust gas recirculation passage for controlling an exhaust gas amount to be recirculated from said exhaust passage through said exhaust gas recirculation passage to said intake passage;

control means for calculating at least one control parameter of said engine based upon operating conditions of said engine including an open/closed condition of said exhaust gas recirculation valve and for controlling said engine using the calculated at least one control parameter;

fuel supply interrupting means for interrupting the supply of fuel to said engine in a decelerating operation of said engine;

pressure detecting means for detecting the intake pressure in said intake passage;

pressure change calculating means for calculating the amount of change in the intake pressure between when opening said exhaust gas recirculation valve and when closing said exhaust gas recirculation valve, during a fuel-cut operation when the fuel supply to said engine is interrupted by said fuel supply interrupting means; and abnormality determining means for determining the abnormality of said exhaust gas recirculation mechanism based upon the amount of change in said intake pressure;

said control means controlling said engine using a parameter of said at least one control parameter which is suitable for a closed condition of said exhaust gas recirculation valve during a predetermined time period from the time of first opening of said exhaust gas recirculation valve after finishing the abnormality determination by said abnormality determining means.

2. A control system according to claim 1, wherein said predetermined time period is a time period required to allow substantially all of the air filling said exhaust gas recirculation passage to flow into said intake passage.

3. A control system according to claim 1, further comprising a lift sensor for detecting the actual valve lift amount of said exhaust gas recirculation valve;

wherein said control means accumulates the actual valve lift amount detected by said lift sensor from the time of first opening of said exhaust gas recirculation valve after finishing the abnormality determination by said abnormality determining means to thereby calculate the accumulated value of actual valve lift amounts and said predetermined time period comprises the time period until the accumulated value of actual valve lift amounts reaches a predetermined value.

4. A control system according to claim 1, wherein the predetermined time period comprises a fixed time period.

5. A control system according to claim 1, wherein said pressure change calculating means has reliability determining means for determining the reliability of the calculated amount change in said intake pressure, and said pressure change calculating means calculates a change in said intake pressure again, when said reliability determining means determines that the reliability of the calculated amount of change in said intake pressure is low.

6. A control system according to claim 1, wherein the at least one control parameter comprises at least one of a fuel amount to be supplied to said engine and an ignition timing of said engine.

7. A control system according to claim 1, wherein said pressure change calculating means corrects the amount of change in the intake pressure detected by said pressure detecting means, according to the rotational speed of said engine to thereby calculate the amount of change in the intake pressure.

8. A control system according to claim 1, further comprising:

deterioration parameter calculating means for calculating a deterioration parameter indicative of the degree of deterioration of said exhaust gas recirculation mechanism, based upon the amount of change in the intake pressure between when opening said exhaust gas recirculation valve and when closing said exhaust gas recirculation valve in the fuel-cut operation;

said control means correcting the at least one control parameter according to the deterioration parameter when said exhaust gas recirculation valve is open.

9. A control system for controlling an internal combustion engine having an exhaust passage and an intake passage, said control system comprising:

an exhaust gas recirculation mechanism having an exhaust gas recirculation passage connected between said exhaust passage and said intake passage, and an exhaust gas recirculation valve provided in said exhaust gas recirculation passage for controlling an exhaust gas amount to be recirculated from said exhaust passage through said exhaust gas recirculation passage to said intake passage;

a control module for calculating at least one control parameter of said engine based upon operating conditions of said engine including an open/closed condition of said exhaust gas recirculation valve and for controlling said engine by using the calculated at least one control parameter;

a fuel supply interrupting module for interrupting the supply of fuel to said engine in a decelerating operation of said engine;

a pressure sensor for detecting the intake pressure in said intake passage;

a pressure change calculating module for calculating the amount of change in the intake pressure between when opening said exhaust gas recirculation valve and when closing said exhaust gas recirculation valve while in a fuel-cut operation where the fuel supply to said engine is interrupted by said fuel supply interrupting module; and an abnormality determining module for determining the abnormality of said exhaust gas recirculation mechanism according to the amount of change in said intake pressure;

said control module controlling said engine by using said at least one control parameter suitable for a closed condition of said exhaust gas recirculation valve during a predetermined time period from the time of first opening of said exhaust gas recirculation valve after finishing the abnormality determination by said abnormality determining module.

10. A control system according to claim 9, wherein said predetermined time period is a time period required for substantially all quantity of air filling said exhaust gas recirculation passage to flow into said intake passage.

11. A control system according to claim 9, further comprising a lift sensor for detecting an actual valve lift amount of said exhaust gas recirculation valve;

said control module accumulating the actual valve lift amount detected by said lift sensor from the time of first opening of said exhaust gas recirculation valve after finishing the abnormality determination by said abnormality determining module to thereby calculate the accumulated value of actual valve lift amounts;

said predetermined time period being a time period until the accumulated value of the actual valve lift amount detected by said lift sensor reaches a predetermined value.

12. A control system according to claim 9, wherein the predetermined time period is a fixed time period.

13. A control system according to claim 9, wherein said pressure change calculating module has a reliability determining module for determining reliability of the calculated amount of change in said intake pressure; and said pressure change calculating module recalculates an amount of change in said intake pressure when said reliability determining module determines that the reliability of the calculated amount of change in said intake pressure is low.

14. A control system according to claim 9, wherein the at least one control parameter is at least one of a fuel amount to be supplied to said engine and an ignition timing of said engine.

15. A control system according to claim 9, wherein said pressure change calculating module corrects the amount of change in the intake pressure detected by said pressure sensor based upon the rotational speed of said engine to thereby calculate the amount of change in the intake pressure.

16. A control system according to claim 9, further comprising a deterioration parameter calculating module for calculating a deterioration parameter indicative of a degree of deterioration of said exhaust gas recirculation mechanism based upon the amount of change in the intake pressure between the time when opening said exhaust gas recirculation valve and when closing said exhaust gas recirculation valve in the fuel-cut operation;

said control module correcting the at least one control parameter according to the deterioration parameter when said exhaust gas recirculation valve is open.

17. A control method for controlling an internal combustion engine being provided with an exhaust passage, an intake passage, an exhaust gas recirculation mechanism having an exhaust gas recirculation passage connected between said exhaust passage and said intake passage, and an exhaust gas recirculation valve provided in said exhaust gas recirculation passage for controlling an exhaust gas amount to be recirculated from said exhaust passage through said exhaust gas recirculation passage to said intake passage, said control method comprising the steps of:

a) calculating at least one control parameter of said engine based upon operating conditions of said engine including an open/closed condition of said exhaust gas recirculation valve;

b) controlling said engine by using the calculated at least one control parameter;

c) interrupting the supply of fuel to said engine in a decelerating operation of said engine;

d) detecting an intake pressure in said intake passage;

e) calculating the amount of change in the intake pressure between at time when opening said exhaust gas recirculation valve and when closing said exhaust gas recirculation valve while in a fuel-cut operation where the fuel supply to said engine is interrupted; and f) determining the abnormality of said exhaust gas recirculation mechanism according to the amount of change in said intake pressure;

wherein said engine is controlled by using said at least one control parameter suitable for a closed condition of said exhaust gas recirculation valve during a predetermined time period from the time of first opening of said exhaust gas recirculation valve after finishing the abnormality determination.

18. A control method according to claim 17, wherein said predetermined time period is a time period required for substantially all quantity of air filling said exhaust gas recirculation passage to flow into said intake passage.

19. A control method according to claim 17, further comprising the step of detecting the actual valve lift amount of said exhaust gas recirculation valve;

wherein the actual valve lift amount detected by said lift sensor is accumulated from the time of first opening of said exhaust gas recirculation valve after finishing the abnormality determination to thereby calculate the accumulated value of actual valve lift amounts, and said predetermined time period is a time period until the accumulated value of actual valve lift amounts reaches a predetermined value.

20. A control method according to claim 17, wherein the predetermined time period is a fixed time period.

21. A control method according to claim 17, wherein the step e) of calculating the amount of change in the intake pressure includes the step of determining reliability of the calculated amount of change in said intake pressure; and the amount of change in said intake pressure is recalculated when the reliability of the calculated amount of change in said intake pressure is determined to be low.

22. A control method according to claim 17, wherein the at least one control parameter is at least one of a fuel amount to be supplied to said engine and an ignition timing of said engine.

23. A control method according to claim 17, wherein the amount of change in the detected intake pressure is corrected based upon the rotational speed of said engine.

24. A control method according to claim 17, further comprising the step of calculating a deterioration parameter indicative of a degree of deterioration of said exhaust gas recirculation mechanism based upon the amount of change in the intake pressure between a time when opening said exhaust gas recirculation valve and when closing said exhaust gas recirculation valve in the fuel-cut operation;

wherein the at least one control parameter is corrected according to the deterioration parameter when said exhaust gas recirculation valve is open.

* * * * *